United States Patent
Lee et al.

(10) Patent No.: US 7,067,777 B2
(45) Date of Patent: Jun. 27, 2006

(54) COMBINED TOASTER AND MICROWAVE OVEN AND CONTROL METHOD THEREOF

(75) Inventors: Byeong Yong Lee, Changwon-si (KR); Sung Un Shin, Changwon-si (KR); Shin Jae Jeong, Changwon-si (KR); Won Kyoung Park, Masan-si (KR)

(73) Assignee: LG Electronics Inc., Seoul (KR)

( * ) Notice: Subject to any disclaimer, the term of this patent is extended or adjusted under 35 U.S.C. 154(b) by 96 days.

(21) Appl. No.: 10/474,999

(22) PCT Filed: Sep. 3, 2003

(86) PCT No.: PCT/KR03/01805

§ 371 (c)(1),
(2), (4) Date: Oct. 17, 2003

(87) PCT Pub. No.: WO2004/023847

PCT Pub. Date: Mar. 18, 2004

(65) Prior Publication Data

US 2005/0077290 A1    Apr. 14, 2005

(30) Foreign Application Priority Data

Sep. 3, 2002   (KR) .................. 10-2002-0052855
Dec. 26, 2002  (KR) .................. 10-2002-0084518
Dec. 30, 2002  (KR) .................. 10-2002-0086533
Jan. 29, 2003  (KR) .................. 10-2003-0005811

(51) Int. Cl.
*H05B 6/68*       (2006.01)

(52) U.S. Cl. ............... 219/680; 219/685; 219/710; 219/719; 99/385; 99/451

(58) Field of Classification Search ........... 219/685, 219/680, 710, 719, 720, 725, 739, 756, 762, 219/763, 386, 413, 521, 491, 494, 506; 99/451, 99/DIG. 14, 385, 325, 327, 399, 391–393
See application file for complete search history.

(56) References Cited

U.S. PATENT DOCUMENTS

| 5,128,521 | A | * | 7/1992 | Lanno et al. ............... 219/518 |
| 5,802,957 | A | * | 9/1998 | Wanat et al. .................. 99/327 |
| 5,967,021 | A |   | 10/1999 | Yung |
| 6,123,012 | A | * | 9/2000 | Hardin et al. ................. 99/326 |

FOREIGN PATENT DOCUMENTS

| EP | 1 213 948 A2 | 6/2002 |
| JP | 4055622 | 2/1992 |

(Continued)

*Primary Examiner*—Philip H. Leung
(74) *Attorney, Agent, or Firm*—McKenna Long & Aldridge LLP

(57) ABSTRACT

The present invention relates to a combined toaster and microwave oven that can obtain uniformly toasted slices of bread even when the slices of the bread are toasted successively several times. The combined toaster and microwave oven includes a key input unit for selecting user's favorite kind of the bread and baking level, a memory for storing heating time of the heaters according to the favorite kind of the bread and the favorite baking level, a temperature sensor for sensing internal temperature of the toaster, a controller for counting an elapsed time for the heaters to operate after the heaters stop and adjusting the heating time of the heaters according to the counted time and the internal temperature of the sensor.

9 Claims, 12 Drawing Sheets

FOREIGN PATENT DOCUMENTS

| | | | | |
|---|---|---|---|---|
| JP | 6-141982 | * 5/1994 | | 99/342 |
| JP | 7239125 | 9/1995 | | |
| JP | 8014580 | 1/1996 | | |
| KP | 10-1997-0029348 | 4/1999 | | |

* cited by examiner ically, at one side of the heating chamber 4, an electronic chamber 10 for generating the microwave is provided, and the electronic chamber 10 is constructed to be covered with an outer case 6. Inside the electronic chamber 10 are installed a magnetron 12 for oscillating the microwave, a high voltage transformer 14 for applying high voltage to the magnetron 12, and a blower fan (not shown) for cooling the electric components and forming an air-flow passing through an internal section of the heating chamber 2.

Although the above-constructed conventional microwave oven has various functions to cook various foods, until now, there no exists a microwave oven having a function that can toast with ease.

In other words, since the conventional microwave oven not having the heater cannot cook a toast at all, in case users intend to make a toast as a simple food, they has suffered from inconvenience of using a separate toaster even though the microwave oven has many functions. Accordingly, the conventional microwave oven has a drawback in which a toaster purchase cost is not only added but also inconvenience in use is caused.

DISCLOSURE OF THE INVENTION

Accordingly, the present invention is directed to a combined toaster and microwave oven and control method thereof that substantially obviates one or more problems due to limitations and disadvantages of the related art.

An object of the present invention is to provide a combined toaster and microwave oven and control method thereof in which, although slices of bread are toasted successively several times, the slices of bread are toasted in the same level.

Another object of the present invention is to provide a combined toaster and microwave oven and control method thereof that can set and adjust a cook time with considering the number and amount of bread to be toasted.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a combined toaster and microwave oven includes a plurality of heaters for heating bread in a toaster;

COMBINED TOASTER AND MICROWAVE OVEN AND CONTROL METHOD THEREOF

TECHNICAL FIELD

The present invention relates to a microwave oven, and more particularly, to a combined toaster and microwave oven and control method thereof.

BACKGROUND ART

Generally, a microwave oven is an apparatus for heating a heat object by means of microwave. Describing the construction of the microwave oven, as shown in FIG. 1, a heating chamber 2 supplied with the microwave and housing the heat object therein is provided in a cavity assembly 1, and the heating chamber 2 is constructed to be opened and closed by a door 4.

Addition a key input unit for selecting user's favorite kind of the bread and baking level; a memory for storing heating time of the heaters according to the favorite kind of the bread and the favorite baking level; a temperature sensor for sensing internal temperature of the toaster; and a controller for counting an elapsed time for the heaters to operate after the heaters stop and adjusting the heating time of the heaters according to the counted time and the internal temperature of the toaster.

To further achieve these and other advantages and in accordance with the purpose of the present invention, a method of controlling a combined toaster and microwave oven includes the steps of: (a) counting the time elapsed for heaters to operate after the heaters finished operating; (b) heating the heaters according to a user's instruction; (c) sensing internal temperature of the toaster; and (d) adjusting heating time of the heaters according to the counted time and the internal temperature of the toaster.

In another aspect of the present invention, a combined toaster and microwave oven includes a first key input unit for selecting a function of a microwave oven; a second key input unit for selecting a function of a toaster, a kind of the bread and a baking level; a plurality of heaters for heating bread in the toaster; a memory for storing heating time of the heaters according to the kind of the bread and the baking level, and a reference change rate of internal temperature of the toaster; a temperature sensor for sensing the internal temperature of the toaster; a controller for sensing the number of slices of the bread in the toaster and adjusting the heating time of the heaters according to the sensed number of the slices of the bread.

In a further aspect of the present invention, a method of controlling a combined toaster and microwave oven includes the steps of: (a) selecting a kind of bread and a baking level at a user; (b) heating heaters according to the selected kind of the bread and the selected baking level; (c) sensing internal temperature of the toaster; (d) sensing the number of slices of the bread in the toaster through the change rate of the sensed internal temperature of the toaster; and (e) adjusting heating time of the heaters according to the sensed number of slices of the bread.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 2:
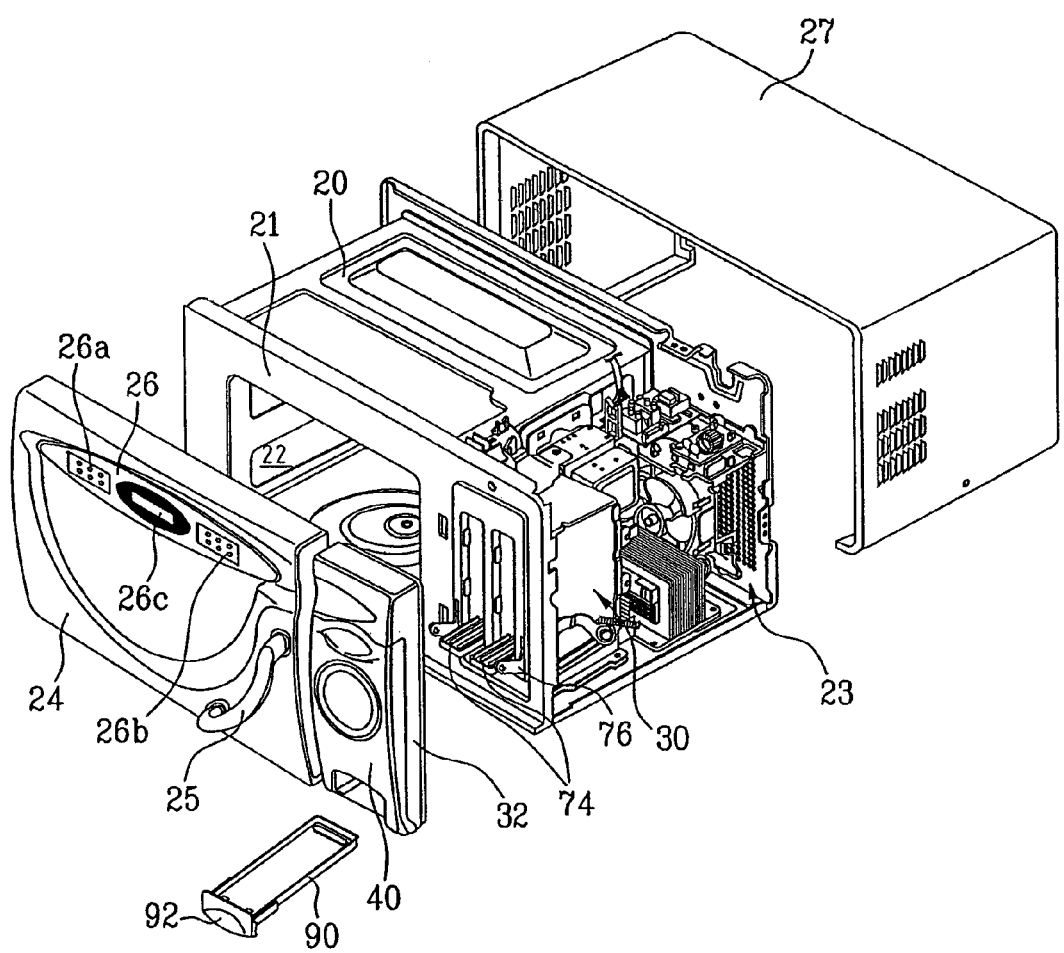
FIG. 2 illustrates a combined toaster and microwave oven according to the present invention.
Figure 3:
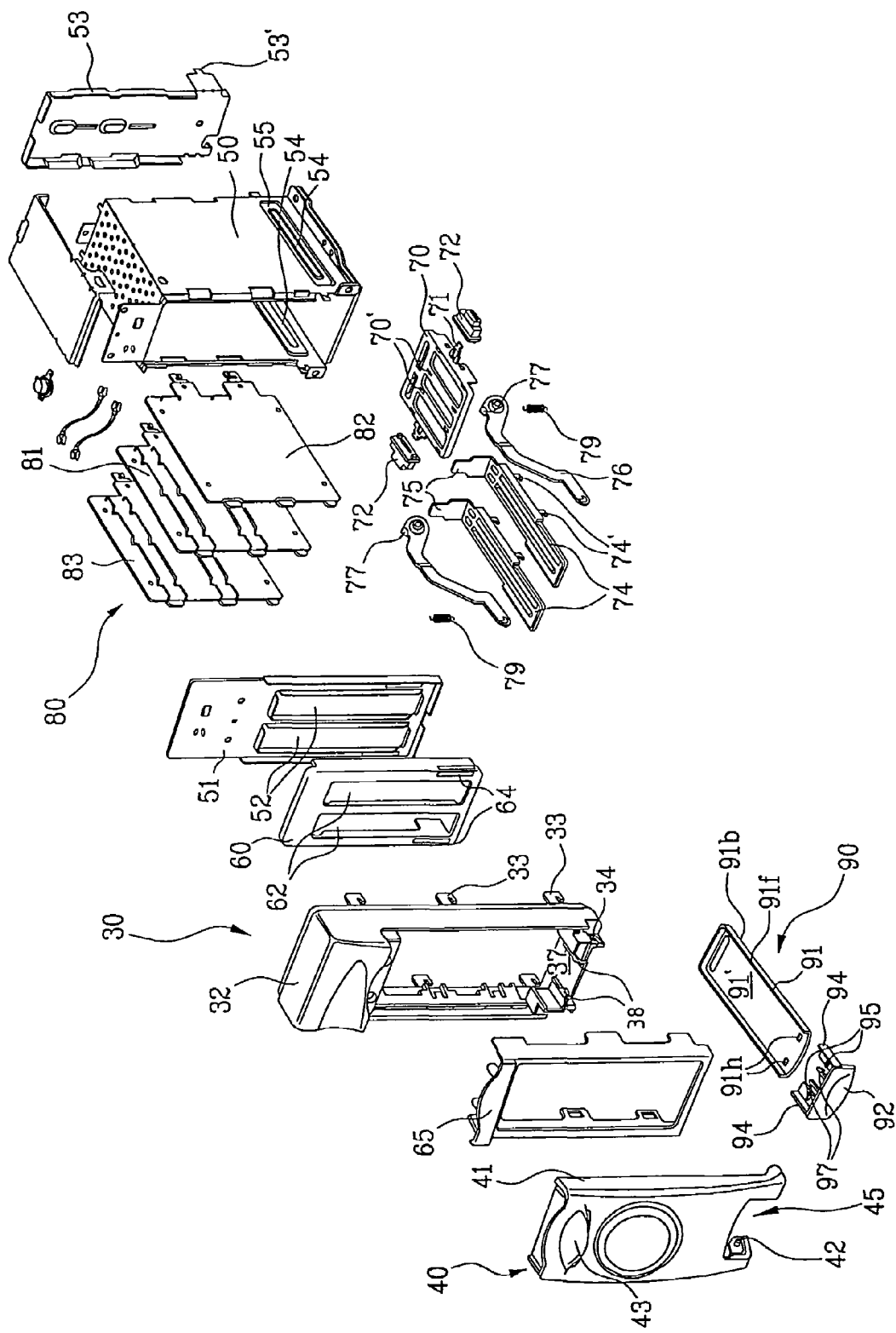
FIG. 3 illustrates configuration of the toaster shown in FIG. 2.

FIG. 2 illustrates a combined toaster and microwave oven according to the present invention, and FIG. 3 illustrates configuration of the toaster shown in FIG. 2.

As shown in FIG. 2, a cooking chamber 22 is positioned at a side of the inside of a cavity assembly 20. An electronic chamber 23 is positioned at the other side of the inside of the cavity assembly 20. In the cooking chamber 22, food is cooked usually using microwave. The electronic chamber 23 is provided with various electronic equipments therein for generating the microwave. The reference 21 denotes a front plate.

The cooking chamber 22 is opened and closed by a cooking chamber door 24. The cooking chamber door 24 is sealingly closed to the front plate 21 so that the cooking chamber 22 is shielded from the exterior. The reference 25 denotes a handle to open and close the door 24 of the cooking chamber 22. The outer case 27 shields the cavity assembly 20 from the electronic equipment chamber 23. The outer case 27 forms a shape of an upper surface and both side surfaces of the microwave oven in this embodiment.

As shown in FIG. 3, the electronic equipment chamber 23 has a toaster 30 penetrating the front plate 21 therein. A toaster panel 32 is positioned on the front surface of the toaster 30. A toaster door 40 is installed at the toaster panel 32. A toaster case 50 is installed on the rear surface of the toaster panel 32. The toaster case 50 is coupled with the toaster panel 32 through the front plate 21. The toaster case 50 is made of metal and has the space to bake bread therein.

The case front plate 51 is positioned on the front surface of the toaster case 50. The case front plate 51 has inlets 52 for receiving and ejecting the bread into and from the toaster case 50. A toaster front 60 is installed at the case front surface 51 and made of metal. The toaster front 60 is exposed to exterior when the toaster door 40 is opened, and has a plurality of rectangular inlets 62 in parallel. The inlets 62 communicate with the inlets 52 of the case front plate 51.

Tray supports 70 are installed in the toaster case 50. The tray supports 70 are provided with trays 74 thereon to stand slices of the bread. The number of the trays 74 is the same as the number of the inlets 62. The trays 74 project to exterior by a predetermined length through the inlets 62 when the toaster door 40 is opened.

The toaster case 50 has heaters 80 for generating heat to bake the bread therein. The heaters 80 are installed at the positions corresponding to both sides of the slices of the bread so as to heat both sides of the slice of the bread. The heaters 80 have heat lines therein for generating heat and can evenly heat both surface of the slice of the bread received standing. A bread crust receiver 90 is installed to be inserted and ejected into and from the toaster case 50 through a lower portion of the toaster panel 32 as a drawer.

In the toaster 30 configured as described above, when the toaster door 40 is opened, the trays 74 are ejected through the inlets 62 to the front. The slices of the bread are placed standing on the trays 74 and the toaster door 40 is closed. Then, the slices of the bread are drawn into the toaster case 50 owing to moving of the trays 74.

When electric power is applied to the heaters 80, heat is generated and the bread is baked. The heaters 80 are installed to bake both sides of the slice of the bread as shown in FIG. 3. In other words, since both surfaces of the slices of the bread standing on the trays 74 should be baked, the heaters 80 includes a left heater 83, a right heater 82 and a center heater 81. One slice of the bread is inserted between the left heater 83 and the center heater 81 and one slice of the bread is inserted between the right heater 82 and the center heater 81. Here, there are two inlets for placing the bread on the trays. If there are three inlets, there should be four heaters, that is, two at center, one at left and one at right.

FIRST EMBODIMENT

Figure 4:
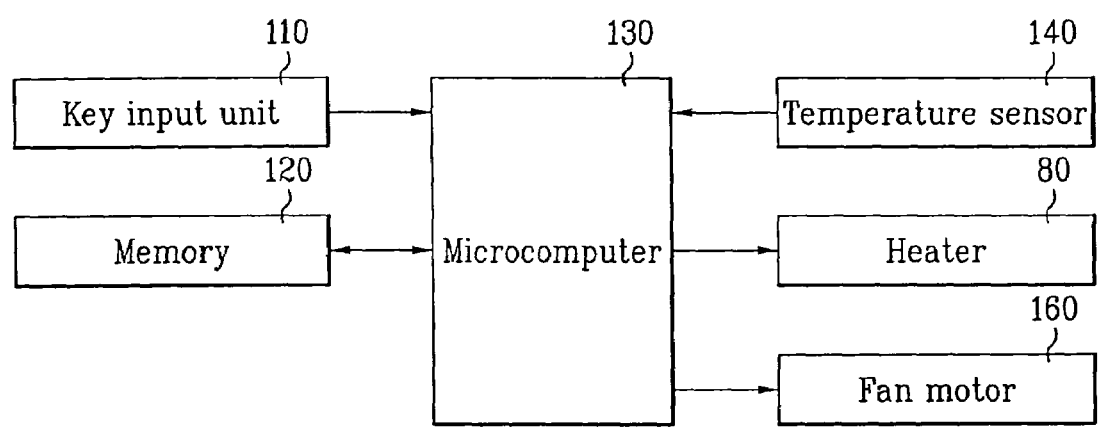
FIG. 4 is a block diagram illustrating components used to control heaters.

FIG. 4 is a block diagram illustrating components used to control a toaster of the combined toaster and microwave oven.

As shown in FIG. 4, the combined toaster and microwave oven according to the present invention includes a plurality of heaters 80 for baking the bread inside the toaster, a fan motor 160 for cooling the inside of the toaster, a key input unit 110 for selecting a menu for operating the toaster and a baking level, a memory 120 for storing cook time set according to the baking level, a temperature sensor 140 for sensing internal temperature of a cooking chamber of the toaster, and a microcomputer 130 for controlling the heaters 80 and the fan motor 160.

The microcomputer 130 counts an elapsed time (hereafter, referred to as cooking end time) from a cooking finish time to a time to input a cooking instruction, reads a first cooking time corresponding to the selected baking level from the memory 120 if a user selects the baking level the key input unit 110 and inputs the cooking instruction, and controls the heaters 80 during the first cooking time. The microcomputer 130 determines a second cooking time to drive the heaters 80 according to the internal temperature sensed by the temperature sensor 140 in the first cooking time and the counted cooking end time. The microcomputer 130 operates the heaters 80 during the second cooking time and stops operating the heaters 80 after the second cooking time elapsed and simultaneously operates the fan motor 160 during the set time.

The method of controlling the toaster of the present invention will be described referring to FIG. 5.

Figure 5:
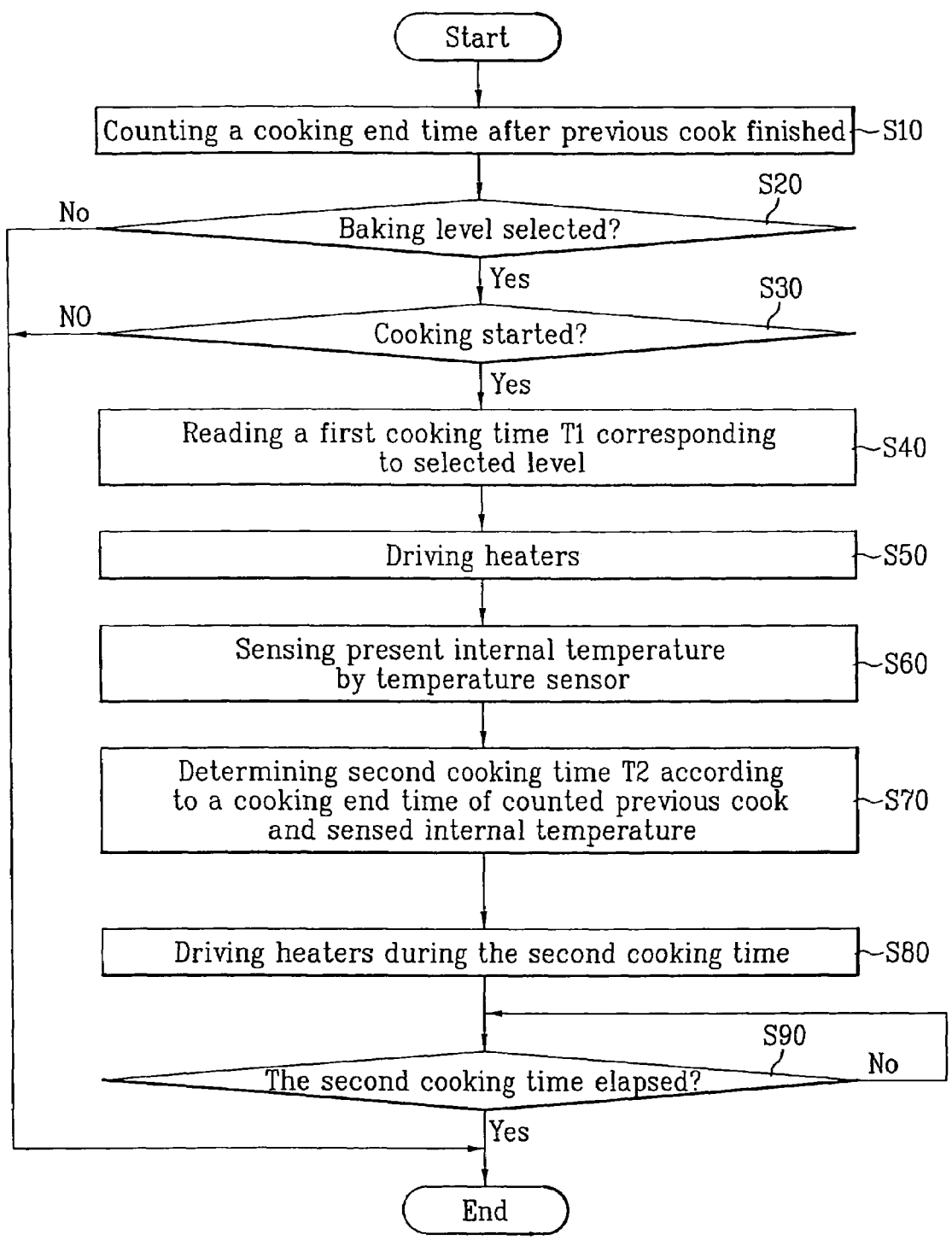
FIGS. 5 and 6 are flowcharts illustrating a toaster control method according to the present invention.

As shown in FIG. 5, when cooking is finished, the microcomputer 130 operates a cooking end time counter until the next cooking instruction is inputted (S10). When the user selects the baking level through the key input unit 110 and inputs the cooking instruction, the microcomputer 130 reads the first cooking time T1 corresponding to the selected baking level from the memory 120 (S20–S40).

The microcomputer 130 operates the heaters 80 during the read first cooking time T1 to bake the bread (S50). The temperature sensor 140 senses the internal temperature Temp of the cooking chamber in the first cooking time Ti or at the time when ten seconds passed after starting cooking (S60).

Afterwards, the second cooking time T2 is determined according to the counted cooking end time and the internal temperature Temp sensed at the step S60 (S70). The microcomputer 130 lengthens the heating time of the heaters 80 as the counted cooking end time is long, and shortens the heating time of the heaters 80 as the counted cooking end time is short. The microcomputer 130 shortens the heating time of the heaters 80 as the internal temperature of the toaster is high, and lengthens the heating time of the heaters 80 as the internal temperature of the toaster is low.

Figure 6:
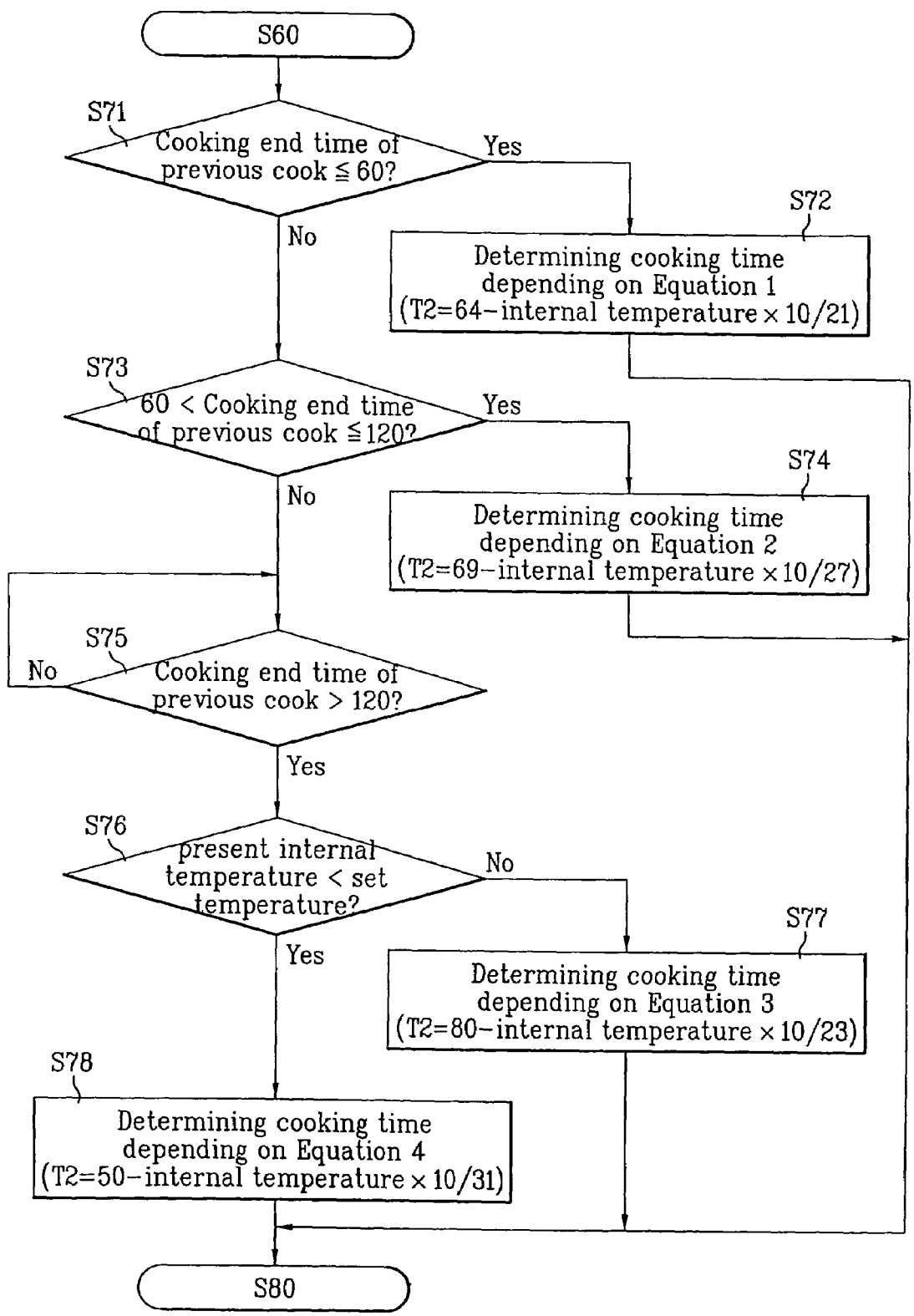

The method to determine the second cooking time T2 will be described in detail as follows. As shown in FIG. 6, the microcomputer 130 compares the first set time with the cooking end time counted after the heaters 80 stops operating. If the counted cooking end time is shorter than the first set time, the second cooking time T2 is determined according to a predetermined equation (S71–S72). Equation 1 is an example of equations to determine the second cooking time T2.

$$T2 = 64 - \text{internal temperature} \times 10/21 \quad \text{Equation 1}$$

On the other hand, if the counted cooking end time is longer than the first set time and shorter than the second set time, the second cooking time T2 is determined according to another predetermined equation (S73–S74). Equation 2 is an example of equations to determine the second cooking time T2 at the step S74.

$$T2 = 69 - \text{internal temperature} \times 10/27 \quad \text{Equation 2}$$

If it is determined that the counted cooking end time is longer than the second set time (S75), the microcomputer 130 compares the internal temperature Temp sensed at the step S60 with the set temperature and determines whether the internal temperature is lower than or equal to the set temperature (S76).

If it is determined that the sensed internal temperature Temp is higher than the set temperature at the step S76, the second cooking time T2 is determined according to Equation 3 (S77). Here, the set temperature is room temperature, especially, about 35° C.

$$T2 = 80 - \text{internal temperature} \times 10/23 \quad \text{Equation 3}$$

On the other hand, if it is determined that the sensed internal temperature Temp is lower than the set temperature at the step S76, the second cooking time T2 is determined according to Equation 4 (S78).

$$T2 = 50 - \text{internal temperature} \times 10/31 \quad \text{Equation 4}$$

Figure 7:
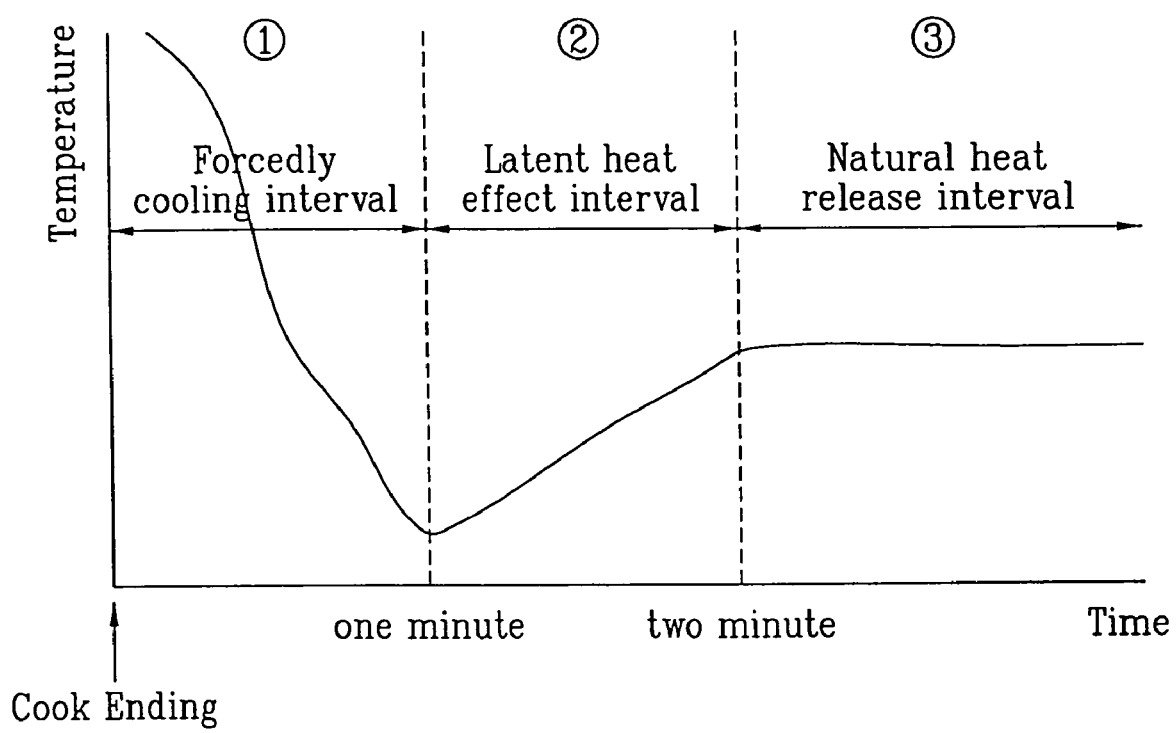
FIG. 7 is a graph illustrating internal temperature of the toaster with respect to elapsed time after the heaters stop.

As shown in FIG. 7, the first set time is the time during which the fan motor 160 is operated from the cooking finish time and the cooking chamber is cooled, especially, the time corresponding to a forcedly cooling interval (1).

The second set time is a latent heat effect interval time (2) in which the internal temperature goes up again due to the latent heat after the fan motor 160 is operated. The interval exceeding the second set time corresponds to the equilibrium interval owing to natural heat release, that is, a natural heat release interval (3).

If the cooking instruction is inputted at the natural heat release interval (3), the second cooking time T2 is determined according to the Equation 3 in case that the internal temperature Temp sensed by the temperature sensor 40 is higher than room temperature but the second cooking time T2 is determined according to the Equation 4 in case that the internal temperature Temp sensed by the temperature sensor 40 is lower than or equal to room temperature.

In the present invention, the toaster cooling time is divided into three intervals (1, 2, 3) according to change of the internal temperature Temp. The second cooking time T2 depends on which interval of the three intervals the heaters 80 are heated again in. Equations 1 to 4 can be derived to calculate the second cooking time T2 for each interval by directly measuring the condition corresponding to each interval through experiment.

During the second cooking time T2 determined as described above, the heaters 80 are maintained to operate to cook food. After the second cooking time T2 is elapsed, the heaters 80 are stopped (S80–S90) and also the fan motor 160 is operated to ventilate the inside of the cooking chamber during the set time.

Accordingly, in the present invention, the optimal cooking time is determined by considering the time between the previous cooking finish time and the time to input cooking instruction again, and the interval temperature of the toaster so that the bread satisfying the users can be provided.

SECOND EMBODIMENT

Figure 8:
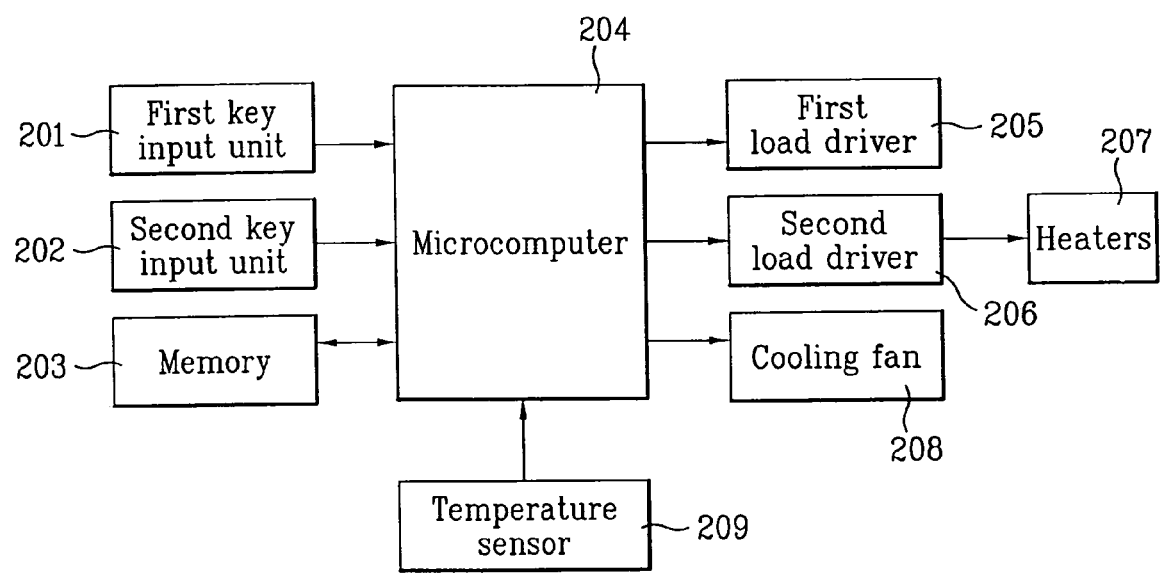
FIG. 8 is a block diagram illustrating another embodiment of the components used to control the heaters.

FIG. 8 is a block diagram illustrating the components used to control the heaters in the combined toaster and microwave oven according to second embodiment of the present invention.

As shown in FIG. 8, a microcomputer 204 is connected to a first key input unit 201 for inputting operation instruction of a microwave oven and selecting a menu of the microwave oven, and a second key input unit 202 for inputting operation instruction of the toaster and selecting a menu of the toaster. The microcomputer 204 outputs a control signal to control the corresponding apparatus according to instructions inputted through the first key input unit 201 or a second key input unit 202;

The microcomputer 204 is connected to a first load driver 205 for driving the microwave oven according to the control signal of the microcomputer 204 and a second load driver 206 for driving the toaster according to the control signal of the microcomputer 204.

Heaters 207 are operated according to a driving signal of the second load driver 206. A cooling fan 208 cools the inside of the toaster. A temperature sensor 209 senses the internal temperature of the toaster. A memory 203 stores heating time of the heaters according to the kind of the bread and the baking level.

Figure 9:
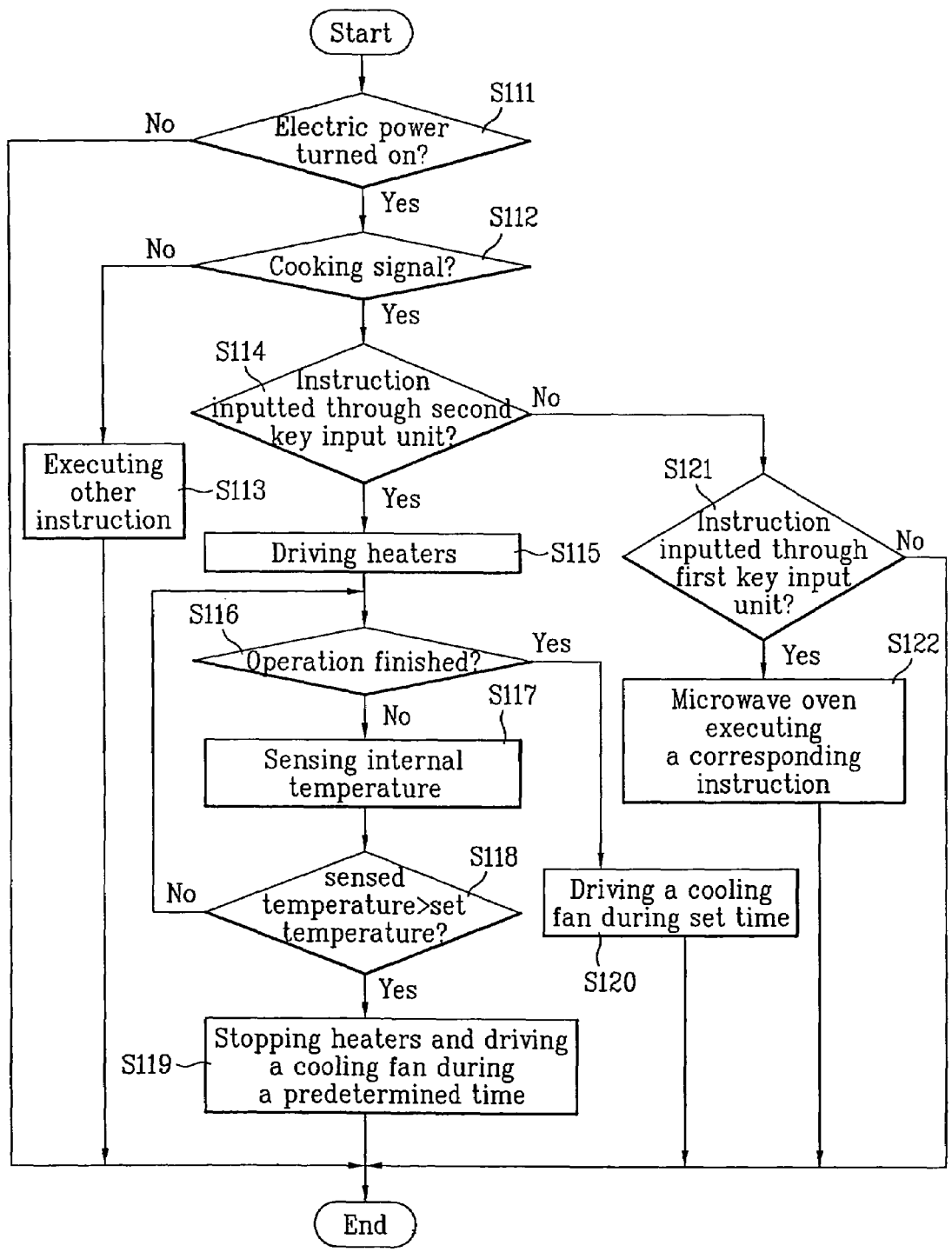
FIG. 9 is a flowchart illustrating another embodiment of the toaster control method of the present invention.

The method of controlling the toaster of the present invention will be described referring to FIG. 9.

The microcomputer 204 determines whether electric power is turned on (S111) and determines whether a cooking signal is inputted (S112). If it is determined whether a cooking signal is inputted at the step S112, it is determined which key input unit of the first key input unit 201 and the second key input unit 202 the user inputs the signal (S114 and S121).

If the user inputted the instruction through the second key input unit 202, the microcomputer 204 displays the function and menu of the toaster on the display unit (not shown). The menu includes the kinds of the bread.

The user selects the kind of the bread in the menu of the toaster. The microcomputer 204 drives the heaters 206 (S115).

The microcomputer 204 sets the cooking time differently depending on the following conditions: no bread is in the toaster; one slice of the bread is in the toaster; and two slices of the bread are in the toaster.

If the heaters 207 are operated in the condition the bread is in the toaster although no bread is in the toaster, fire accident may be caused due to overheating and also electricity is used more than necessary amount, so that energy is wasted. In addition, if the heaters 207 are operated as the same condition at both the condition one slice of the bread is in the toaster and the condition two slices of the bread are in the toaster, the bread is baked too less or too more. Accordingly, the toaster of the combined toaster and microwave oven of the present invention adjusts the cooking condition automatically cooks cooking objects depending on the number and the kind of the cooking objects.

In more detail, the memory 203 built in the combined toaster and microwave oven stores the set heating time of the heaters 207 according to the number of the cooking objects and the reference change rate of the internal temperature of the toaster according to the number of slices of the bread. The temperature sensor 209 senses the internal temperature of the toaster when heating the heaters 207 (S117). In case that the internal temperature of the toaster sensed by the temperature sensor 209, for example, in case that the internal temperature of the toaster goes up rapidly over the set temperature when 10 seconds elapsed after heating the heaters 207 (S118); the microcomputer 204 determines that no bread is in the toaster and turns the heaters 207 off after a predetermined time elapses (S119). The microcomputer 204 can compare the change rate of the internal temperature of the toaster sensed by the temperature sensor 209 with the reference change rate of the internal temperature of the toaster stored in the memory, to sense the quantity of the bread inside the toaster. Since the internal temperature increase rates of the two cases, that is, the case where one slice of the bread is in the toaster and the case where two slices of the bread are in the toaster, are different from each other, the microcomputer 204 adjusts the cooking condition and controls the heaters 207 based on the internal temperature increase rate and properties related to the internal temperature increase rate.

The combined toaster and microwave oven according to the second embodiment of the present invention automatically sets and adjusts the cooking time by considering the interval temperature of the toaster and the number of the slices of the bread or cooking objects so that the bread can be baked to satisfy the users.

THIRD EMBODIMENT

Figure 10:
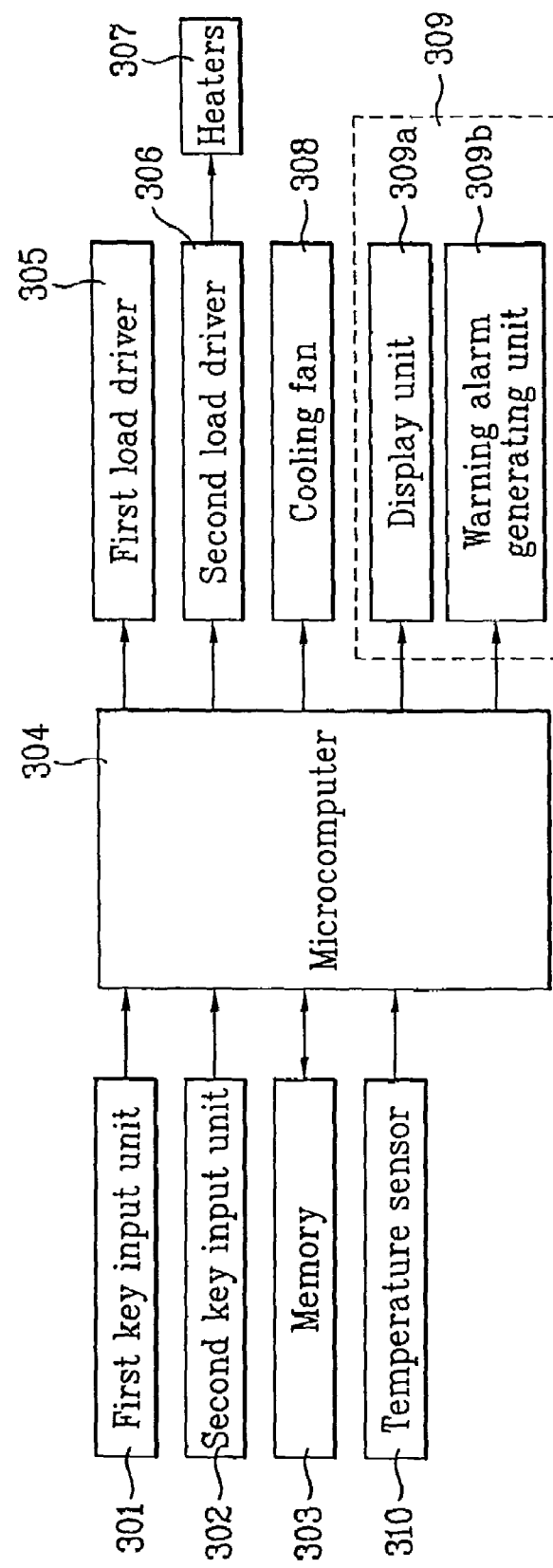
FIG. 10 is a block diagram illustrating components used to control the combined toaster and microwave oven according to the present invention.

FIG. 10 is a block diagram illustrating components used to control a toaster of the combined toaster and microwave oven according to the present invention.

As shown in FIG. 10, a combined toaster and microwave oven according to the present invention includes a first key input unit 301 for inputting operation instruction of a microwave oven and selecting a menu of the microwave oven, a second key input unit 302 for inputting operation instruction of the toaster and selecting a menu of the toaster, a microcomputer 304 for outputting a corresponding control signal according to instructions inputted through the first key input unit 301 or a second key input unit 302, determining whether the internal temperature sensed by the temperature sensor 310 is higher than the set temperature and informing the user of the fault of the toaster, a first load driver 305 for driving the microwave oven according to the control signal of the microcomputer 304, a second load driver 306 for driving the toaster according to the control signal of the microcomputer 304, heaters 307 for operating according to a driving signal of the second load driver 306, a temperature sensor 310 for sensing the internal temperature of the toaster when the operation instruction is inputted through the second key input unit 302, a cooling fan 308 for operating according to the control signal of the microcomputer 304, and a warning message output unit 309 for informing the user of the fault according to the control signal of the microcomputer 304.

Here, the warning message output unit 309 includes a display unit 309a for displaying a fault warning message in text, and a warning alarm generating unit 309b for making a fault warning alarm.

In the combined toaster and microwave oven of the present invention having a structure described above, when operation instruction is inputted through the second key input unit 302, the microcomputer 304 controls the heaters 307 to operate according to the condition set by the user.

If the heaters 307 are operated, the temperature sensor 310 senses the internal temperature of the toaster and the corresponding control instruction is outputted from the microcomputer 304 according to whether the sensed internal temperature is higher than or equal to the set temperature. In other words, if the internal temperature sensed by the temperature sensor 310 is higher than or equal to the set temperature, the microcomputer 304 stops the heaters 307 and drives the cooling fan 308.

Additionally, if the heaters 307 stops and the cooling fan 308 operates, the warning message output unit 309 outputs a fault warning message in text or warning alarm.

The method of controlling the combined toaster and microwave oven of the present invention will be described as follows. The microcomputer 304 determines whether electric power is turned on. If it is determined whether electric power is turned on, it is determined which key input unit of the first key input unit 301 and the second key input unit 302 the user inputs the instruction. If the user inputted the instruction through the first key input unit 301, the microcomputer 304 drives the microwave oven. On the contrary, if the user inputted the instruction through the second key input unit 302, the microcomputer 304 drives the heaters 307 according to the corresponding instruction.

If the heaters 307 are operated, the microcomputer 304 senses the internal temperature of the toaster by the temperature sensor 310 and determines whether the sensed internal temperature of the toaster is higher than or equal to the set temperature. If the sensed internal temperature of the toaster is higher than or equal to the set temperature, the microcomputer 304 determines that the toaster is overheated and outputs a fault warning message in text or warning alarm by the warning message output unit 309. On the contrary, if the sensed internal temperature of the toaster is lower than the set temperature, the microcomputer 304 senses the internal temperature of the toaster until the heater 307 finishes its operation.

After that, when the heater 307 finishes its operation, the microcomputer 304 drives the cooling fan 308 to have a cooling time.

As described above, the combined toaster and microwave oven according to the third embodiment of the present invention senses the internal temperature of the toaster continuously, and controls the heaters 306 and a cooling fan 308 according to whether the sensed internal temperature is higher than or equal to the set temperature and also outputs a fault warning message in text or warning alarm for the user so that it can inform the user of the danger to be caused by overheat.

Figure 11:
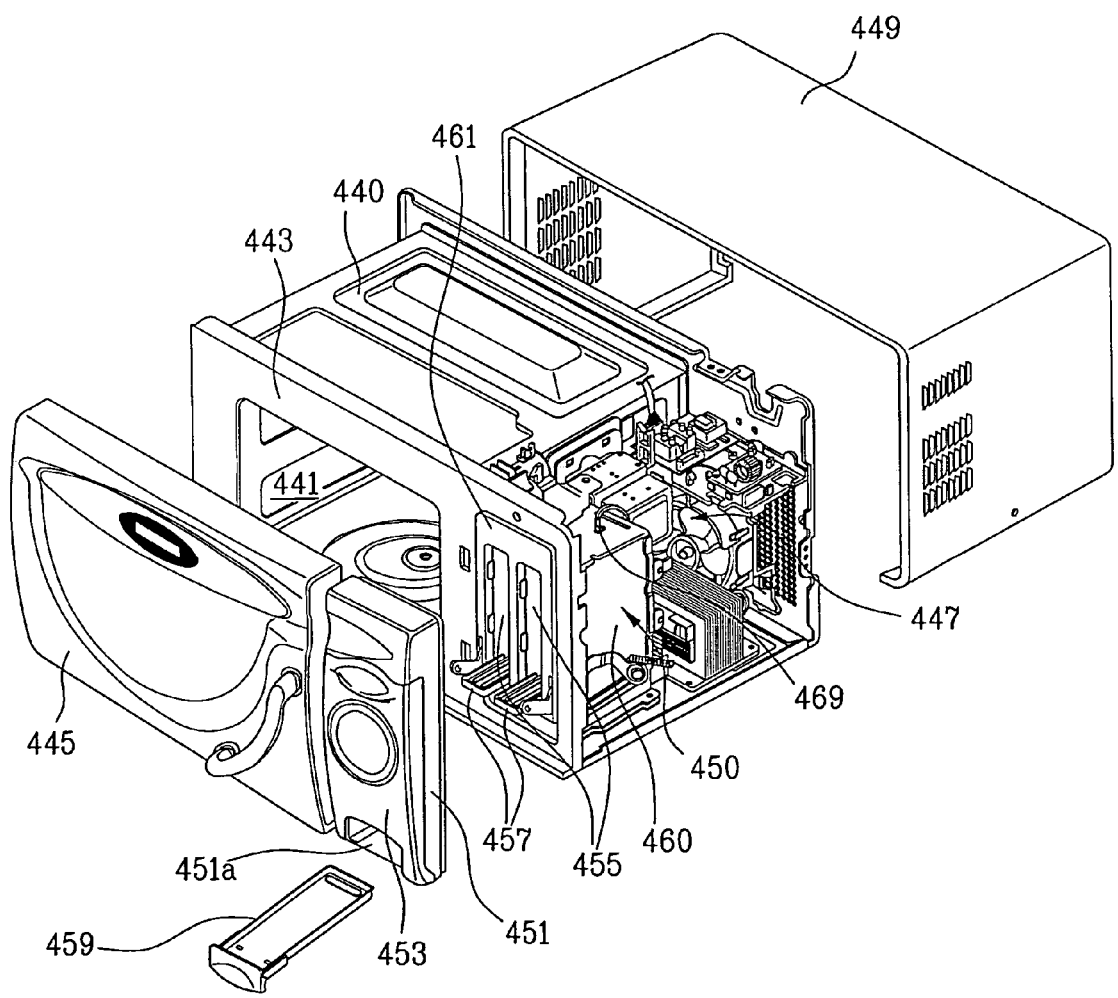
FIG. 11 illustrates a combined toaster and microwave oven according to another embodiment of the present invention.

FIG. 11 illustrates a modified combined toaster and microwave oven according to another embodiment of the present invention shown in FIG. 2. As shown in FIG. 11, the cavity assembly 440 of the combined toaster and microwave oven has cooking chamber 441 that is a space for heating cooking objects by using microwave.

A cooking camber door 445 for opening and closing the cooking chamber 441 is installed on a side of a front plate 443 of the cavity assembly 440. An electronic equipment chamber 447 in which various electronic parts for generating microwave are formed on a side (right side in a drawing) of the cavity assembly 440. The upper portion and both side of the cavity assembly 440 are shielded by an outer case 449 forming a shape of upper surface and both side surfaces of the microwave oven.

A toaster 450 is installed as a baking apparatus inside the electronic equipment chamber 447. The toaster 450 includes a toaster panel 451 formed on the front, a toaster case 460 installed on the rear of the toaster panel 451 and having a predetermined space, and a toaster door 453 installed rotatably on the toaster panel 451.

A tray inlet 451a which a bread crust tray 459 is ejected from and will be described later is formed on a lower portion of the toaster panel 451. A case front plate 461 having a pair of inlets for ejecting the bread is installed on the front surface of the toaster case 460.

The toaster door 453 opens and closes the inlets by rotating by a predetermined angle with respect to the lower portion. The toaster door 453 is made of plastic material as the cooking chamber door 445 so that the front appearance of the microwave oven looks uniform.

A couple of slots 455 in the toaster case 460. The slots 455 receive the bread and extend toward the rear of the toaster case 460 from the inlet.

A bread tray 457 for easily ejecting the bread through the slot is installed on a lower portion of the slot 455. The bread tray 457 is the place which the bread is placed on and installed at the lower portion of the slot 455 horizontally. The bread tray 457 interworks with rotation of the toaster door 453 and is ejected back and forth from the slot 455 so as to easily eject the bread from the slot 455.

A bread crust tray 459 is installed at the lower portion of the toaster case 460 and collects bread crusts when the bread is ejected or baked. The bread crust tray 459 is installed so as to be ejected through the tray inlet 451a formed at the lower portion of the toaster panel 451.

Figure 12:
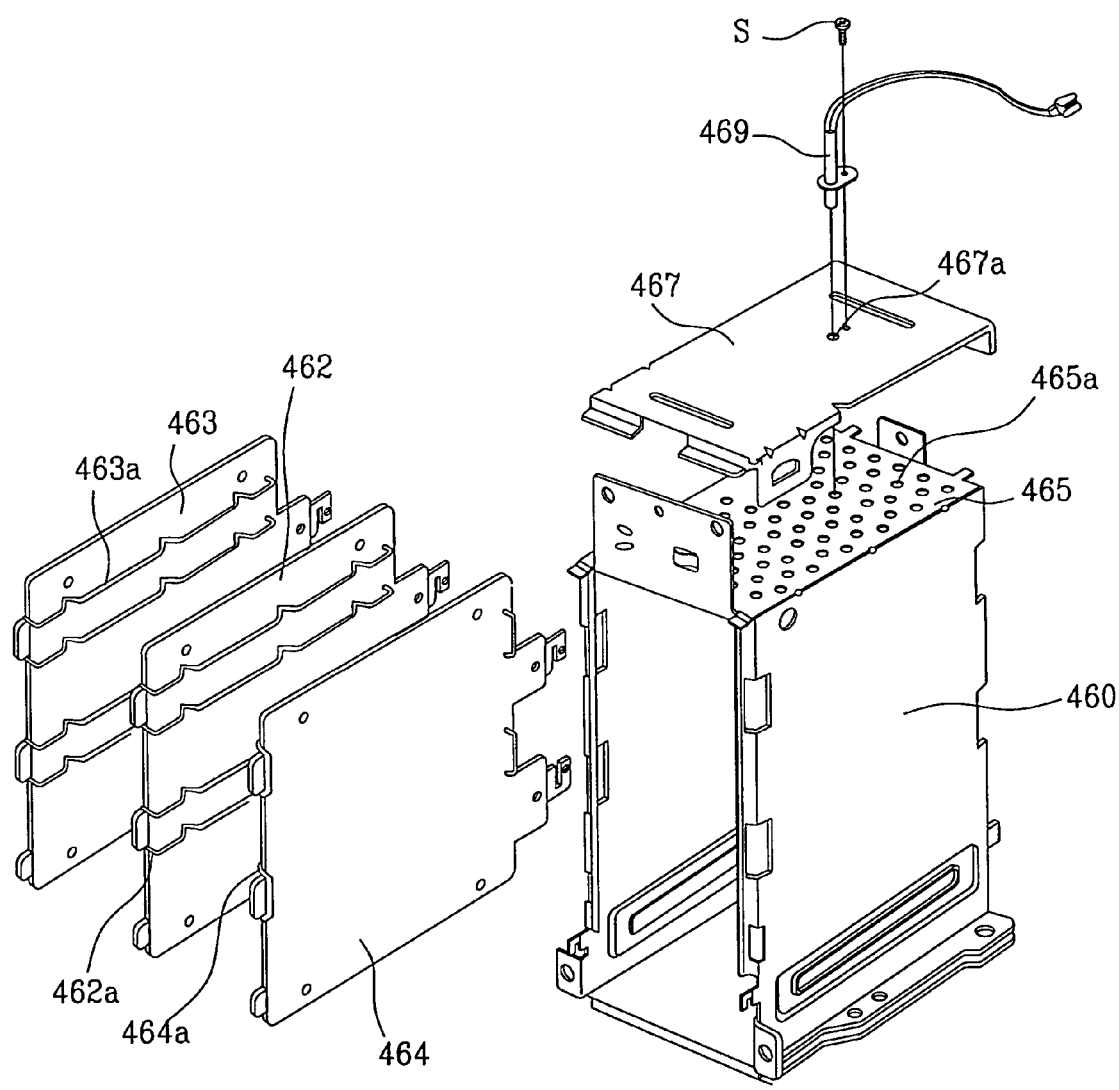
FIG. 12 illustrates configuration of a toaster shown in FIG. 11.

FIG. 12 illustrates configuration of a toaster case according to the present invention in detail. As shown in FIG. 12, a plurality of heaters 462, 463 and 464 are installed on both sides of the slot 455 inside the toaster case 460. The heaters 462, 463 and 464 are for heating the bread and installed on both sides of the inside of the toaster case 460 and between the slots 455.

A plurality of bread holders 462a, 463a and 464a are installed on the sides of the heaters 462, 463 and 464. The heaters 462, 463 and 464 are installed on both side surfaces of the center heater 462 and on facing surfaces of the left and right heaters 463 and 464 so as to prevent the bread inserted into the slot 455 from directly contacting the surface of the heaters 462, 463 and 464.

A plurality of vents 465a for releasing heat generated when baking the bread to exterior are formed on an upper plate 465 forming the upper surface of the toaster case 460. A plurality of intake ports (not shown) are formed on the lower surface of the toaster case 460. Accordingly, the air flowing toward the toaster case 460 due to the cooling fan of the electronic equipment chamber 447 is introduced into the toaster case 460 through the intake ports and vented out to the electronic equipment chamber 447 through the vents 465a. Thanks to the air ventilating in the toaster case 460, the heat generated from the heaters 462, 463 and 464 installed in the toaster case 460 vents out to the electronic equipment chamber 447.

Figure 1:
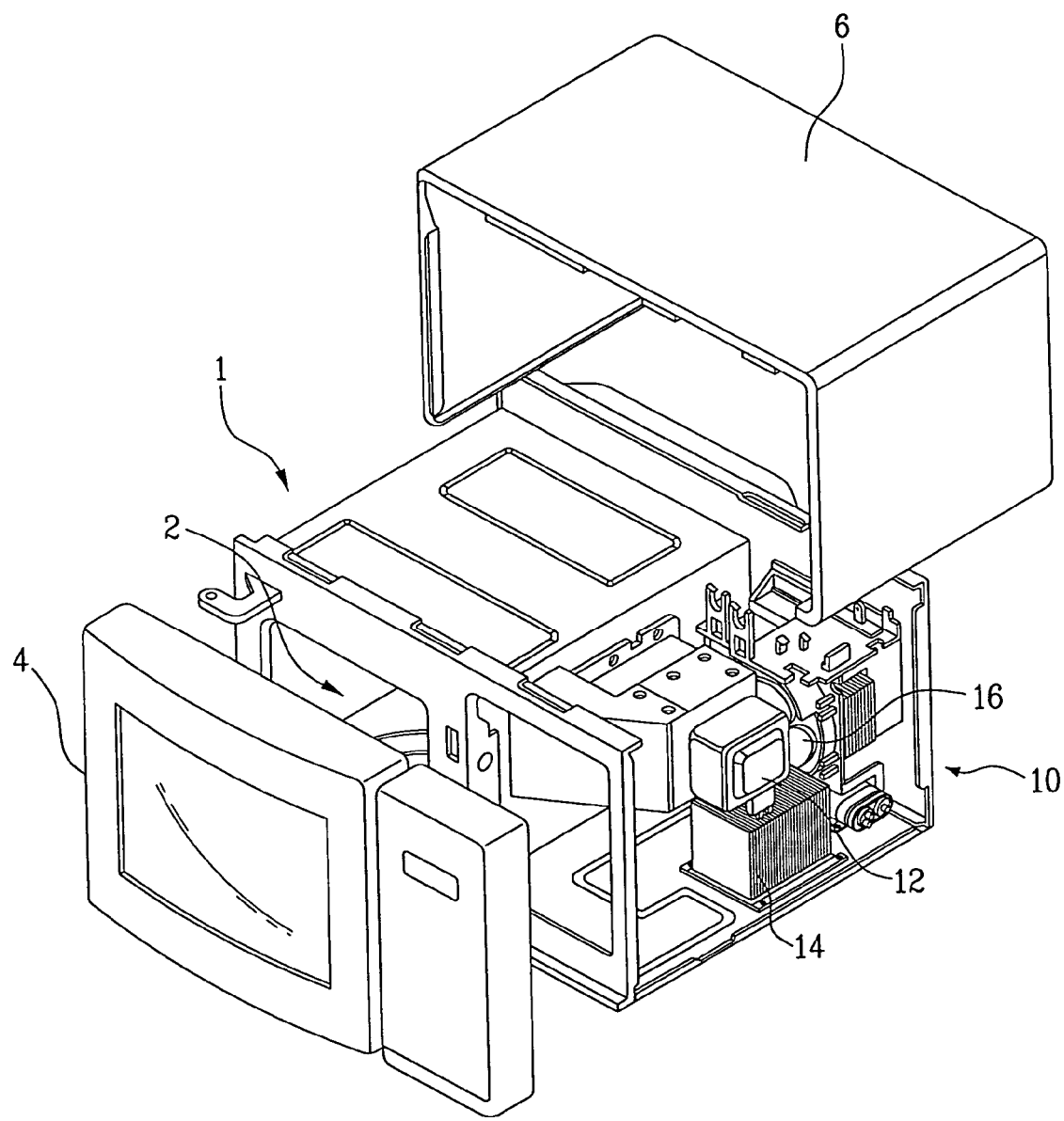
FIG. 1 illustrates a conventional microwave oven.

An air tunnel 467 for guiding the heat inside the toaster case 460 vented out through the vents 465a is installed on the upper plate 465. The air tunnel 467 is formed to open the rear end of both side surfaces. Since the front surface of the toaster case 460 is shielded by the toaster door 453 (referring to FIG. 1), the heat vented out through the vents 465a is guided to the electronic equipment chamber 447 of the rear of the toaster case 460 by the air tunnel 467.

A thermistor 469 for sensing the internal temperature of the toaster case 460 is installed on one side of the air tunnel 467. The thermistor 469 is installed to penetrate a through holes 467a of the air tunnel 467, penetrate any one of the vents 465a of the upper plate 465 and project into the toaster case 460.

Preferably, the thermistor 469 is positioned at the center of the toaster case 460, especially, between the two slots 455 to precisely sense the internal temperature of the toaster case 460. Since the heat inside the toaster case 460 is vented out through the vents 465a and moves from the rear of the toaster case 460 to the electronic equipment chamber 447, the thermistor 469 is desirably installed at the position shifted slightly-from the center inside of the toaster case 460 to the rear of the toaster case 460.

In other words, the thermistor 469 penetrates through holes 467a positioned at the position shifted slightly from the center to the rear of the air tunnel 467, penetrates the vents 465a formed at positions corresponding to the through holes 467a so that the thermistor 469 is positioned on the flow of the heat vented out through the vents 465a.

In the depicted embodiment, since there are two slots 455, the thermistor 469 is installed between the two slots 455. However, for example, if there are three slots 455, the thermistor 469 is installed at the cent slot 455 of the three slots.

Meanwhile, to precisely sense the internal temperature of the toaster case 460 and the temperature of the heat vented out through the vents 465a inside the toaster case 460, the lower portion of the thermistor 469 penetrates the vents 465a and projects into the toaster case 460 and the upper portion of the thermistor 469 is installed to be positioned between the upper plate 465 and air tunnel 467. The thermistor 469 can be fixed on the upper surface of the air tunnel 467 by means of screws S.

The process to use the combined toaster and microwave oven of the present invention having such a structure will be described.

The front end of the toaster door 453 is rotated downwards to open the inlet of the toaster case 460. Simultaneously, the bread tray 457 installed at the lower portion of the slots 455 interworks with rotation of the toaster door 453 and led out to the front of the slots 455.

If the bead tray 457 is led, the bread is placed on the upper surface and the front end of the toaster door 453 is rotated upwards to shield the inlet. The bread tray 457 interworks with rotation of the toaster door 453 and received in the slots 455.

If the bread is placed in the toaster case 460, the user manipulates the key input unit to input the user's instruction. The user's inputted instruction is transferred to the controller such as the microcomputer and the controller drives the heater inside the toaster case 460 so that the bread inserted into the slots 455 is baked.

The bread crusts falling from the bread when ejecting the bread from the slot 455 or when baking the bread inserted into the slot 455 are collected in the bread tray 459.

If the cooling fan of the electronic equipment chamber 447, air is introduced into the toaster case 460 through the intake formed on the bottom surface of the toaster case 460. The air introduced into the toaster case 460 is vented out through a plurality of the vents 465*a* to the electronic equipment chamber 447 along with the heat generated when the bread is baked in the toaster case 460.

Here, owing to the thermistor 469, the internal temperature of the toaster case 460 can be sensed. The controller controls the heaters 462, 463 and 464 depending on the internal temperature sensed by the thermistor 469 so that the bread can be baked uniformly and evenly in the toaster case 460.

Since the thermistor 469 is installed at the position shifted slightly from the center of the upper plate 465 and the air tunnel 467 to the rear, the thermistor 469 is positioned on the flow of the heat vented out of the toaster case to the electronic equipment chamber 447. Accordingly, the internal temperature of the toaster case 460 can be sensed more precisely. Since the thermistor 469 has its lower portion penetrating the vents 465*a* and projecting into the toaster case 460, and its upper portion positioned between the upper plate 465 and the air tunnel 467, the internal temperature of the toaster case 460 and the temperature of the heat vented out through the vents 465*a* can be sensed more precisely.

Referring to FIG. 11, obviously, it is the basic technical idea that the baking temperature is adjusted depending on the temperature sensed by the thermistor so that the bread is baked uniformed and evenly.

INDUSTRIAL APPLICABILITY

The combined toaster and microwave oven of the present invention can obtain the following effects.

First, in the present invention, the optimal cooking time is determined by considering the time between the previous cooking finish time and the re-input time of the cooking start command, and the internal temperature of the toaster. Accordingly, the uniformly toasted slices of bread can be obtained even though the slices of bread are toasted successively several times.

Second, it is possible that the cook time can be automatically set and adjusted with considering the internal temperature and the quantity of bread. Also, when the toaster is overheated, the heaters are automatically are stopped and the cooling fan is operated. Therefore, the parts inside the toaster are prevented from being deformed and a fire accident can be avoided.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A combined toaster and microwave oven comprising:
a plurality of heaters for heating food in the toaster;
an input unit for selecting a type of food to be toasted and a desired toasting level;
a memory for storing a heating time corresponding to the selected food and toasting level;
a temperature sensor for sensing internal temperature of the toaster; and
a controller for determining an amount of time that has elapsed since a previous heater operation and adjusting the heating time as a function of the elapsed time and the internal temperature of the toaster, wherein the controller is configured to compare the elapsed time with a number of reference times and is configured to calculate the heating time based on the comparison, and wherein the reference times include a reference time that reflects a latent heat interval within the toaster after the previous heater operation.

2. The combined toaster and microwave oven of claim 1, wherein the reference times include another reference time that reflects a cooling interval after the previous heater operation.

3. The combined toaster and microwave oven of claim 1, wherein the controller lengthens the heating time if the elapsed time is longer than at least one of the reference times, and the controller shortens the heating time if the elapsed time is shorter than at least one of the reference times.

4. The combined toaster and microwave oven of claim 1, wherein the controller shortens the heating time if the internal temperature of the toaster is higher than a reference temperature, and the controller lengthens the heating time if the internal temperature of the toaster is lower than the reference temperature.

5. The combined toaster and microwave oven of claim 1, further comprising:
an output unit for informing the user when the heaters are overheated.

6. A method of controlling heaters in a combined toaster and microwave oven, the method comprising the steps of:
selecting a type of food to be toasted and a desired toasting level;
reading a heating time of the heaters from a memory, wherein the heating time is a function of the type of food and the desired toasting level;
measuring an amount of time that has elapsed since a previous heater operation;
activating the heaters;
sensing an internal temperature of a toaster; and
adjusting the heating time as a function of the elapsed time and the internal temperature of the toaster, wherein the adjusting step includes:
comparing the elapsed time with a number of reference times; and
adjusting the heating time based on the comparison;
wherein the reference times include a reference time that reflects a latent heat interval within the toaster after the previous heater operation.

7. The method of claim 6, further comprising the steps of:
lengthening the heating time if the elapsed time is longer than at least one of the reference times; and
shortening the heating time if the elapsed time is shorter than at least one of the reference times.

8. The method of claim 6, wherein the reference times include another reference time that reflects a cooling interval after the previous heater operation.

9. The method of claim 6, wherein the adjusting step comprises the steps of:
shortening the heating time if the internal temperature of the toaster is higher than a reference temperature; and
lengthening of the heating time if the internal temperature of the toaster is lower than the reference temperature.

* * * * *